United States Patent [19]
Nguyen et al.

[11] Patent Number: 5,730,003
[45] Date of Patent: Mar. 24, 1998

[54] CRYOGENIC HYBRID SYSTEM FOR PRODUCING HIGH PURITY ARGON

[75] Inventors: Tu Cam Nguyen, Tonawanda; Mohamed Safdar Allie Baksh, Amherst; Dante Patrick Bonaquist, Grand Island; Joseph Alfred Weber, Cheektowaga, all of N.Y.

[73] Assignee: Praxair Technology, Inc., Danbury, Conn.

[21] Appl. No.: 834,830

[22] Filed: Mar. 26, 1997

[51] Int. Cl.6 .......................................... F25J 1/00
[52] U.S. Cl. ................... 62/648; 62/908; 62/924
[58] Field of Search ........................ 62/648, 908, 924

[56] References Cited

U.S. PATENT DOCUMENTS

| | | | |
|---|---|---|---|
| Re. 34,595 | 5/1994 | Chen et al. ....................... | 95/54 |
| 4,477,265 | 10/1984 | Kumar et al. ..................... | 55/26 |
| 4,717,406 | 1/1988 | Giacobbe .......................... | 62/908 |
| 4,752,311 | 6/1988 | MacLean et al. .................. | 62/908 |
| 4,761,167 | 8/1988 | Nicholas et al. .................. | 62/908 |
| 4,957,523 | 9/1990 | Zarate et al. ..................... | 62/908 |
| 5,133,790 | 7/1992 | Bianchi et al. ................... | 62/22 |
| 5,220,797 | 6/1993 | Krishnamurthy et al. ......... | 62/22 |
| 5,294,418 | 3/1994 | Ramprasad et al. .............. | 423/219 |
| 5,313,800 | 5/1994 | Howard et al. ................... | 62/22 |
| 5,440,884 | 8/1995 | Bonaquist et al. ................ | 62/22 |
| 5,469,710 | 11/1995 | Howard et al. ................... | 62/22 |
| 5,518,526 | 5/1996 | Baksh et al. ...................... | 95/100 |
| 5,557,951 | 9/1996 | Prasad et al. ..................... | 62/648 |

OTHER PUBLICATIONS

Jain et al., "Hybrid Process for Argon and Nitrogen Coproduction", AIChE Symposium, pp. 18–23 (1993).
Krishnamurthy, "Evaluation of Competing Technologies for Hydrogen and Argon Recovery from Ammonia Plant Purge Gas", AIChE Symposium, pp. 109–113 (1993).

*Primary Examiner*—Ronald C. Capossela
*Attorney, Agent, or Firm*—Stanley Ktorides

[57] ABSTRACT

A system for producing high purity argon wherein crude argon produced in a cryogenic rectification plant is processed in a pressure swing adsorption unit. Residual gas from the pressure swing adsorption unit is recycled to the cryogenic rectification plant and high purity argon is cooled prior to recovery against oxygen-containing fluid which is subsequently passed into the cryogenic rectification plant.

10 Claims, 3 Drawing Sheets

5,730,003

CRYOGENIC HYBRID SYSTEM FOR PRODUCING HIGH PURITY ARGON

TECHNICAL FIELD

This invention relates generally to the production of argon from the separation of feed air and, more particularly, to the production of high purity argon.

BACKGROUND ART

High purity argon is presently produced by processing crude argon produced in an argon column associated with a cryogenic rectification plant. The crude argon is purified by using catalytic deoxygenation wherein hydrogen is mixed with the crude argon which is then passed over a catalyst. Oxygen within the crude argon reacts with the hydrogen to form water which is then removed in a drying step. Thereafter the argon undergoes a nitrogen removal step, generally by cryogenic separation, resulting in product high purity argon. While this system is effective, it is costly and complex and, moreover, it is impractical if hydrogen is not readily available on a continuous basis.

It is known that argon may be produced essentially free of oxygen by using an argon column having a large number of equilibrium stages, generally on the order of 150 equilibrium stages or more. Such a superstaged argon column, however, has both high construction and high maintenance costs. Furthermore, because of the relative volatilities of the components of air, in the operation of this superstaged argon column, the nitrogen goes with the argon and thus a separate nitrogen removal step is still required in order to produce high purity argon.

Accordingly it is an object of this invention to provide a system which can produce high purity argon without need for catalytic deoxygenation of a crude argon stream and also without need for employing a superstaged argon column.

SUMMARY OF THE INVENTION

The above and other objects, which will become apparent to one skilled in the art upon a reading of this disclosure, are attained by the present invention, one aspect of which is:

A cryogenic hybrid process for producing high purity argon comprising:

(A) passing feed air into a higher pressure column of a cryogenic rectification plant which also comprises a lower pressure column and an argon column, separating feed air by cryogenic rectification within the higher pressure column to produce oxygen-enriched fluid, and passing oxygen-enriched fluid into the lower pressure column;

(B) passing fluid comprising oxygen and argon as argon column feed from the lower pressure column into the argon column and separating the argon column feed by cryogenic rectification within the argon column to produce crude argon fluid containing up to 10 mole percent oxygen;

(C) passing crude argon fluid from the argon column into a pressure swing adsorption unit containing oxygen selective adsorbent and adsorbing oxygen from the crude argon fluid onto the oxygen selective adsorbent to produce high purity argon fluid and oxygen-containing residual gas;

(D) recycling oxygen-containing residual gas from the pressure swing adsorption unit to the cryogenic rectification plant;

(E) cooling high purity argon fluid by indirect heat exchange with oxygen-containing cooling fluid and passing the resulting oxygen-containing cooling fluid into the cryogenic rectification plant; and (F) recovering high purity argon fluid as product high purity argon.

Another aspect of the invention is:

Apparatus for producing high purity argon comprising:

(A) a cryogenic rectification plant comprising a first column, a second column and an argon column, means for passing feed air into the first column, and means for passing fluid from the lower portion of the first column into the second column;

(B) means for passing fluid from the second column into the argon column;

(C) a pressure swing adsorption unit containing oxygen selective adsorbent and means for passing fluid from the upper portion of the argon column into the pressure swing adsorption unit;

(D) means for passing fluid from the pressure swing adsorption unit into the cryogenic rectification plant;

(E) a heat exchanger and means for passing oxygen-containing cooling fluid to the heat exchanger and from the heat exchanger into the cryogenic rectification plant; and (F) means for passing high purity argon from the pressure swing adsorption unit to the heat exchanger and means for recovering product high purity argon from the heat exchanger.

As used herein, the term "feed air" means a mixture comprising primarily oxygen, nitrogen and argon, such as ambient air.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*. The term, double column, is used to mean a higher pressure column having its upper portion in heat exchange relation with the lower portion of a lower pressure column. A further discussion of double columns appears in Ruheman "The Separation of Gases", Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is generally adiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein, the term "indirect heat exchange" means the bringing of two fluid streams into heat exchange relation without any physical contact or intermixing of the fluids with each other.

As used herein, the term "top condenser" means a heat exchange device that generates column downflow liquid from column vapor.

As used herein, the terms "turboexpansion" and "turboexpander" mean respectively method and apparatus for the flow of high pressure gas through a turbine to reduce the pressure and the temperature of the gas thereby generating refrigeration.

As used herein, the terms "upper portion" and "lower portion" mean those sections of a column respectively above and below the mid point of the column.

As used herein, the term "equilibrium stage" means a vapor-liquid contacting stage whereby the vapor and liquid leaving the stage are in mass transfer equilibrium, e.g. a tray having 100 percent efficiency or a packing element height equivalent to one theoretical plate (HETP).

As used herein, the term "argon column" means a column which processes a feed comprising argon and produces a product having an argon concentration which exceeds that of the feed. An argon column generally comprises a top condenser.

As used herein the term "pressure swing adsorption unit" means a system for carrying out a separation process comprising the principal steps of adsorption, during which species in a mixture are preferentially adsorbed onto adsorbent, and regeneration or desorption, wherein the preferentially adsorbed species are removed from the adsorbent by a reduction in the pressure.

As used herein the term "oxygen selective adsorbent" means a material that preferentially adsorbs oxygen from a mixture which comprises oxygen and other component(s).

As used herein the term "nitrogen selective adsorbent" means a material that preferentially adsorbs nitrogen from a mixture which comprises nitrogen and other component(s).

The numerals in the Figures are the same for the common elements.

DETAILED DESCRIPTION

Figure 1:
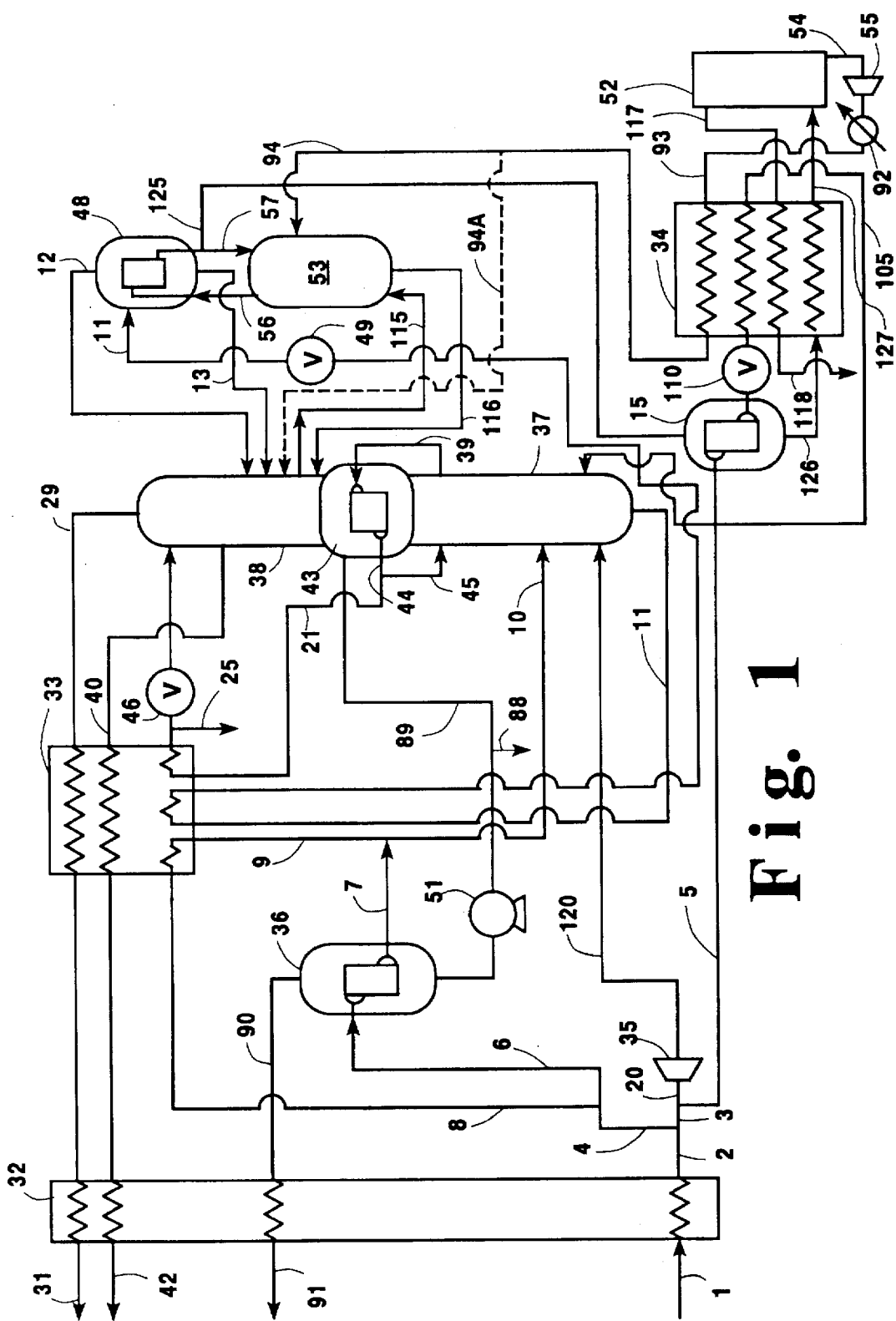
FIG. 1 is a schematic representation of a particularly preferred embodiment of the invention wherein oxygen and/or nitrogen product is made in addition to high purity argon product.

The invention will be described in detail with reference to the Drawings. Referring now to FIG. 1, feed air 1, which has been cleaned of high boiling impurities such as carbon dioxide, water vapor and hydrocarbons, and has been compressed by passage through a feed air compressor (not shown) to a pressure generally within the range of from 70 to 500 pounds per square inch absolute (psia), is cooled by indirect heat exchange with return streams in main heat exchanger 32. Resulting cooled feed air stream 2 is divided into a first portion 3 and second portion 4. Second portion 4, which comprises from 20 to 55 percent of feed air 1, may be further divided into streams 6 and 8. Stream 8, which comprises 0 to 10 percent of feed air 1, is liquefied by indirect heat exchange with return streams in heat exchanger 33 and resulting stream 9 from heat exchanger 33 is passed into higher pressure column 37. Stream 6, which comprises 20 to 45 percent of feed air 1, is passed to product boiler 36 wherein it is condensed by indirect heat exchange with boiling high pressure liquid oxygen from liquid pump 51. Resulting liquid feed air 7 is passed into the higher pressure column. In the embodiment illustrated in FIG. 1, stream 7 is combined with stream 9 to form stream 10 which is then fed to column 37. Feed air stream 3 is divided into a major stream 20 and minor stream 5. Stream 20 is turboexpanded in turboexpander 35 to generate refrigeration and resulting stream 120 is fed to column 37. Minor stream 5, comprising about 1 percent of feed air 1, is also ultimately fed to column 37 as will be described in detail below.

Column 37 is the first column or higher pressure column of a double column comprising column 37 and second or lower pressure column 38. The double column and argon column 53 comprise the cryogenic rectification plant of this invention. Column 37 is operating at a pressure generally within the range from 70 to 150 psia. Within column 37, the feed air is separated by cryogenic rectification into nitrogen-enriched vapor and oxygen-enriched liquid. Nitrogen-enriched vapor is passed in line 39 into main condenser 43 wherein it is condensed by indirect heat exchange with column 38 bottom liquid. Resulting nitrogen-enriched liquid is passed out of main condenser 43 in stream 44. A portion 45 of the nitrogen-enriched liquid is passed back into higher pressure column 37 as reflux and another portion 21 of the nitrogen-enriched liquid is subcooled in heat exchanger 33 and passed through valve 46 into lower pressure column 38 as reflux. If desired, a portion of the nitrogen-enriched liquid, such as is shown by stream 25, may be recovered as product liquid nitrogen.

The oxygen-enriched liquid contains most of the oxygen and the argon that was in the feed air which was passed into column 37. The oxygen-enriched liquid is withdrawn from the lower portion of higher pressure column 37 in stream 11, is subcooled in subcooler or heat exchanger 33 against return streams and then passed through valve 49 into the boiling side of argon column top condenser 48. Crude argon vapor, having an argon concentration of at least 90 mole percent, is passed into the condensing side of top condenser 48. Within top condenser 48, oxygen-enriched liquid is at least partially vaporized by indirect heat exchange with the crude argon fluid. Resulting oxygen-enriched gas is passed from top condenser 48 in stream 12 into lower pressure column 38. Remaining oxygen-enriched liquid may be passed from top condenser 48 in stream 13 into lower pressure column 38.

Lower pressure or second column 38 is operating at a pressure less than that of higher pressure or first column 37 and generally within the range of from 15 to 25 psia. Within column 38, the various feeds into the column are separated by cryogenic rectification into nitrogen-rich vapor and oxygen-rich liquid. Nitrogen-rich vapor is withdrawn from the upper portion of column 38 in stream 29, warmed by passage through heat exchangers 33 and 32 and withdrawn from the system in stream 31 which may be recovered as nitrogen gas product having a nitrogen concentration of 99 mole percent or more. For product purity control purposes a waste stream 40 may be withdrawn from column 38 below the point where stream 29 is withdrawn, warmed by passage through heat exchangers 33 and 32 and withdrawn from the system in stream 42.

Oxygen-rich liquid at the bottom of column 38 is vaporized to provide vapor upflow for column 38 against the condensing nitrogen-enriched vapor. A portion of the resulting oxygen-rich gas may be recovered directly from column 38. In the preferred embodiment illustrated in FIG. 1, a portion of the oxygen-rich liquid is withdrawn from column 38 as stream 89 and then passed into product boiler 36. If desired, the pressure of the oxygen-rich liquid may be increased by passage through liquid pump 51 or, alternatively, by liquid head due to an elevation difference between heat exchangers 43 and 36. Also, if desired, a portion of the oxygen-rich liquid may be recovered as product liquid oxygen as shown by stream 88. Oxygen-rich liquid passed into product boiler 36 is vaporized by indirect heat exchange within product boiler 36 against the aforesaid condensing feed air. Resulting oxygen-rich gas is withdrawn from product boiler 36 in stream 90, warmed by passage through main heat exchanger 32 and removed from the system as stream 91 which may be recovered as oxygen gas product having an oxygen concentration generally within the range of from 99 to 99.9 mole percent.

In the practice of this invention top condenser 48 is part of argon column 53. Argon column 53 also comprises a column section having from about 40 to 65 equilibrium stages and produces a crude argon fluid having an argon concentration within the range of from 90 to 99 mole percent. A fluid containing from about 8 to 25 mole percent argon with the remainder mostly oxygen is passed in stream 115 as argon column feed from lower pressure column 38 into argon column 53. Preferably lower pressure column 38 is operated in accordance with the practice described and claimed in U.S. Pat. No. 5,133,790—Bianchi et al., which is incorporated herein by reference, so that argon column feed stream 115 has a very low nitrogen concentration, generally not more than 5 ppm, preferably not more than 1 ppm. Within argon column 53, argon column feed 115 is separated by cryogenic rectification into oxygen-richer liquid and crude argon vapor. Oxygen-richer liquid is passed back into lower pressure column 38 from argon column 53 in stream 116. Crude argon vapor, containing up to about 10 mole percent oxygen, is passed in line 56 into the condensing side of top condenser 48 wherein it is at least partially condensed against the aforesaid oxygen-enriched liquid 11 from column 37. Resulting crude argon fluid is passed in line 57 to the argon column section for reflux. A portion of the crude argon fluid in either gaseous or liquid form is passed as crude argon fluid to pressure swing adsorption (PSA) unit 52 for further refinement.

In the preferred embodiment illustrated in FIG. 1, the crude argon fluid is passed from argon column 53 as liquid in stream 125 and is pressurized by liquid head due to an elevation difference between top condenser 48 and argon boiler 15, wherein the crude argon liquid is vaporized against the aforesaid feed air stream 5. This elevated pressure, which could be up to 70 psia, eliminates the need for a crude argon compressor. The resulting elevated pressure crude argon vapor is passed in stream 126 from argon boiler 15 to heat exchanger 34 wherein it is heated to the operating temperature of PSA unit 52 through indirect heating against high purity argon fluid 117 and oxygen-containing residual gas stream 54 returning from PSA unit 52. The heated crude argon vapor stream 127 exiting heat exchanger 34 is then fed to PSA unit 52 for final removal of oxygen.

PSA unit 52 contains oxygen selective adsorbent. Among the oxygen selective adsorbents which may be employed in the practice of this invention one can name carbon molecular sieve, clinoptilolite, type A zeolite, and the adsorbents disclosed in U.S. Pat. No. 5,294,418—Ramprasad et al.

In the event that the crude argon fluid also contains a significant amount of nitrogen, PSA unit 52 may also contain nitrogen selective adsorbent in a layer separate from the oxygen selective adsorbent. Among the nitrogen selective adsorbents which may be employed in the practice of this invention one can name type A zeolite such as CaA, type X zeolite such as LiX, NaX and CaX, and zeolites of types A and X containing mixed cations selected from groups I and II of the periodic table, such as LiNaX.

As the crude argon passes through PSA unit 52, oxygen is adsorbed from the crude argon vapor onto the oxygen selective adsorbent. If nitrogen is present in the crude argon vapor, the nitrogen is adsorbed from the crude argon vapor onto the nitrogen selective adsorbent. This results in the production of high purity argon fluid generally having an argon concentration of at least 99.9 mole percent, preferably at least 99.999 mole percent, which exits PSA unit 52 as stream 117. Upon desorption, oxygen-containing residual gas is withdrawn from PSA unit 52 in stream 54.

The oxygen-containing residual gas is recycled from the PSA unit to the cryogenic rectification plant. Referring back to FIG. 1, oxygen-containing residual gas is withdrawn from PSA unit 52 in stream 54, and compressed in compressor 55. After being cooled of heat of compression in cooler 92, resulting compressed residual gas stream 93 is passed through heat exchanger 34 wherein it is cooled by indirect heat exchange with warming crude argon. Resulting residual gas 94 is passed preferably into argon column 53 as additional column feed for separation to produce crude argon. If desired some or all of stream 94 could be passed into lower pressure column 38 for separation therein as shown by broken line 94A. Moreover, some or all of stream 54 may be passed to the feed air compressor prior to being recycled to the cryogenic rectification plant.

High purity argon fluid is withdrawn from PSA unit 52 in stream 117 and is cooled by indirect heat exchange with oxygen containing cooling fluid by passage through heat exchange 34. The oxygen-containing cooling fluid is then passed into the cryogenic rectification plant. In the preferred embodiment illustrated in FIG. 1, the oxygen-containing cooling fluid is feed air stream 5 which has been passed through valve 110 and into heat exchanger 34. Resulting feed air stream 105 is then passed from heat exchange 34 into higher pressure column 37. Alternatively, the oxygen-containing cooling fluid could be oxygen-enriched fluid taken from the higher pressure column and, after passage through heat exchanger 34, would be passed into the lower pressure column. Those skilled in the art will also recognize that units 15 and 34 shown in FIG. 1 could be combined into a single heat exchanger. Moreover, if the crude argon fluid is taken from the argon column as vapor, the need for the crude argon boiler would be eliminated.

Cooled high purity argon fluid is withdrawn from heat exchanger 34 in stream 118 and is recovered as product high purity argon.

Figure 2:
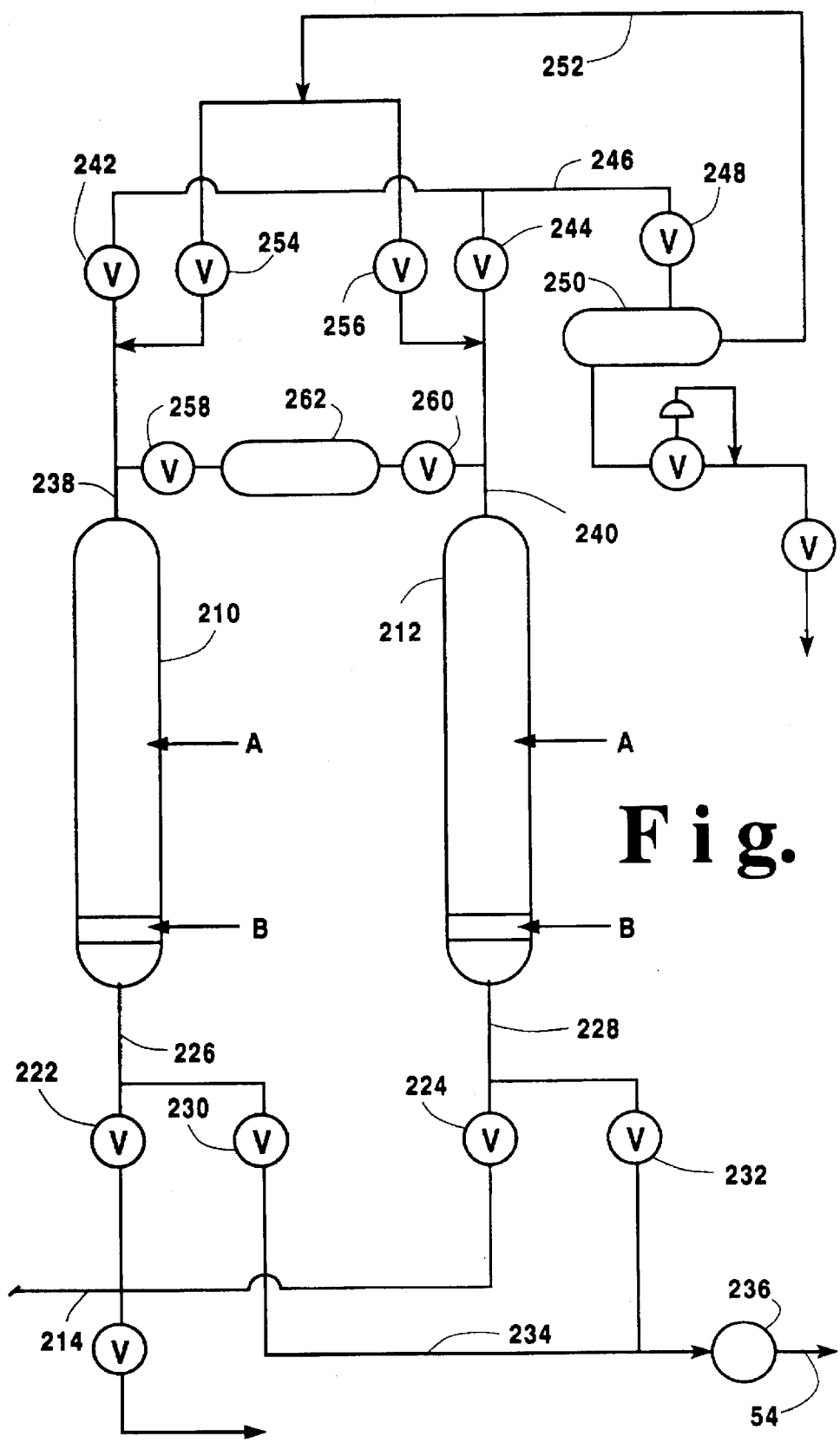
FIG. 2 is a schematic representation of a two bed pressure swing adsorption unit which may be used in the practice of this invention.
Figure 3:
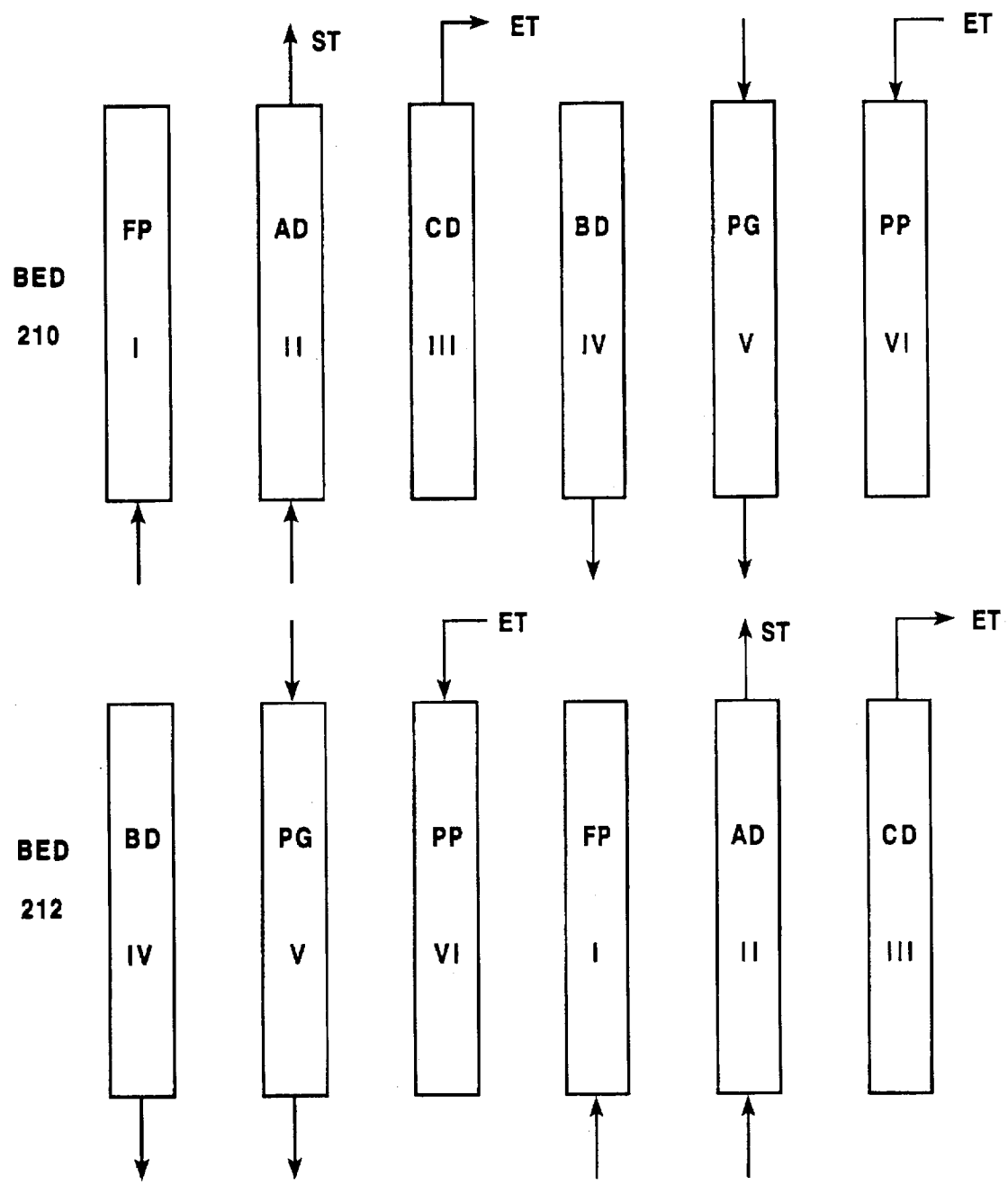
FIG. 3 is a diagrammatic representation illustrating the operation of a pressure swing adsorption unit.

FIGS. 2 and 3 illustrate in greater detail the operation of PSA unit 52. FIG. 2 shows details of the PSA unit 52 depicted in FIG. 1, and FIG. 3 shows the column cycle for the PSA process. Referring to FIGS. 2 and 3, the PSA process goes through the following steps separately or in any combination:

Step I: Feed (crude argon fluid) pressurization (FP).

Step II: Constant high pressure adsorption and product make (AD).

Step III: Cocurrent depressurization (CD) to an intermediate desorption pressure.

Step IV: Counter-current blowdown (BD)/evacuation (EV).

Step V: Countercurrent Purging (PG).

Step VI: Light component (Ar) pressurization to an intermediate adsorption pressure (PP).

The basic features of PSA unit of the invention can be illustrated by describing the operation of a two bed PSA process. Those skilled in the art will recognize that more than two beds could be employed in the practice of this invention. Now referring to FIGS. 2 and 3, the operation of the PSA process is described over one cycle.

The PSA process described here comprises two beds 210 and 212 each filled with one or more layers (A&B) of adsorbent. An argon inlet conduit 214 provides compressed crude argon to feed valves 222 and 224, and bed inlets 226 and 228, respectively. A pair of exhaust valves 230 and 232 connect bed inlets 226 and 228 to conduit 234, which is coupled to an optional vacuum pump 236.

Beds 210 and 212 include product outlet conduits 238 and 240 which communicate, via valves 242 and 244, to a product conduit 246, and through a control valve 248 to a product storage tank 250. Conduit 252 and valve 254 and 256 enable a feed of product gas from storage tank 250 to beds 210 and 212, respectively. Conduit 252 supplies additional gas necessary for refluxing (purging and product pressurization).

Outlet conduits 238 and 240 are further connected via valves 258 and 260, respectively, to allow gas obtained from a cocurrent depressurization step to enter an equalization tank 262. All of the valves illustrated in FIG. 2 are operated electronically via a computer system program logic. In the practice of this invention, the gas required for purging is first taken from the equalization tank 262. If additional purge gas is required, then higher purity gas is taken from product storage tank 250, via conduit 252.

After the purge step is completed, the product pressurization begins. Gas required for the product pressurization step is obtained from product storage tank 250. However, if after purging, the equalization tank 262 contains residual gas, then the residual gas is used in the early stage of product pressurization. Once the gas in the equalization tank 262 is depleted, then the higher purity gas from storage tank 250 is used for completing product pressurization.

Again referring to FIGS. 2 and 3, the two-bed PSA process is now described to illustrate the opening and closing of the valves for each step of the cycle. In the description, all valves are assumed to be closed in each step of the cycle, unless explicitly declared to be in the opened position for that step.

Step I: (FP): Feed (crude argon fluid) is introduced at one end of the bed. In the case of bed 210, valve 222 is opened to allow feed gas to enter the bed and pressurize bed 210. During this time, valve 232 is opened and the other bed (bed 212) is undergoing step IV (blowdown/evacuation). Some or all of the effluent from bed 212 during this step is recycled to the cryogenic rectification plant as shown by stream 54.

Step II: (AD): Gross product make step. Here valve 222 and 242 are opened. Control logic dictates when control valve 248 will open to allow product gas to enter the storage tank 250. For instance, if constant pressure is required, then control valve 248 only opens when bed 210 reaches a predetermined pressure level to allow product gas to enter the storage tank 250. During the product make step, valves 232 and 260 are opened to purge bed 212. The gas required for the purge step is received from the equalization tank 262. However, if additional gas is required for purging, then valve 260 is closed and valve 256 is opened, to allow higher purity gas from the storage tank 250 to enter bed 212. Some or all of the effluent from bed 212 during this step is recycled to the cryogenic rectification plant as shown by stream 54. In the preferred practice of the invention, all of the purging gas comes from the equalization tank.

Step III: (CD): Valves 222 and 242 are closed and valve 258 is opened to allow bed 210 to undergo the cocurrent depressurization (CD) step. During this time, valve 232 is closed, and valve 256 is opened, so that product gas is obtained from the storage tank 250 for bed 212 product pressurization step. If the equalization tank 262 contains residual gas after the bed 212 purge step is completed, then prior to opening valve 256, valve 260 is opened to use any residual gas from the equalization tank 262 in the early stage of product pressurization. Upon depleting all of the residual gas in the equalization tank 262, valve 260 is closed and valve 256 is opened to complete the bed 212 product pressurization step.

Step IV: (BD): Valve 258 is closed and valve 230 opened to blowdown/evacuate bed 210 countercurrently. Some or all of the effluent from bed 210 during this step is recycled to the cryogenic rectification plant as shown by stream 54. During this time, valve 256 is closed and valve 224 is opened so that bed 212 undergoes feed pressurization at one end of the bed.

Step V: (PG): Valve 258 is now opened, so that bed 210 receives gas from the equalization tank 262 for purging. If additional gas is required for purging, then valve 258 is closed and valve 254 is opened, to allow higher purity gas from the storage tank 250 to enter bed 210. In the preferred practice of the invention, all of the purging gas comes from the equalization tank 262. Some or all of the effluent from bed 210 during this step is recycled to the cryogenic rectification plant as stream 54. During this time, valves 224 and 244 are opened so that bed 212 is in the production step. Control logic operates valve 248 to enable a flow of product gas from bed 212 to product tank 250.

Step VI: (PP): During the product pressurization step (PP) of bed 210, valve 230 is closed, and valve 254 is opened, so that product gas is obtained from the storage tank 250 for bed 210 product pressurization. If equalization tank 262 contains residual gas after the bed 210 purge step, then prior to opening valve 254, valve 258 is opened to use any residual gas from the equalization tank 262 in the early stage of product pressurization. Upon depleting all of the residual gas in the equalization tank 262, valve 258 is closed and valve 254 is opened to complete the bed 210 product pressurization step. During this time, valves 224 and 244 are closed, and valve 260 is opened to direct effluent from bed 212, now undergoing the cocurrent depressurization (CD) step, to enter the equalization tank 262.

Although the invention has been described in detail with reference to certain preferred embodiments, those skilled in the art will recognize that there are other embodiments of the invention within the spirit and the scope of the claims.

We claim:

1. A cryogenic hybrid process for producing high purity argon comprising:

(A) passing feed air into a higher pressure column of a cryogenic rectification plant which also comprises a lower pressure column and an argon column, separating feed air by cryogenic rectification within the higher pressure column to produce oxygen-enriched fluid, and passing oxygen-enriched fluid into the lower pressure column;

(B) passing fluid comprising oxygen and argon as argon column feed from the lower pressure column into the argon column and separating the argon column feed by cryogenic rectification within the argon column to produce crude argon fluid containing up to 10 mole percent oxygen;

(C) passing crude argon fluid from the argon column into a pressure swing adsorption unit containing oxygen selective adsorbent and adsorbing oxygen from the crude argon fluid onto the oxygen selective adsorbent to produce high purity argon fluid and oxygen-containing residual gas;

(D) recycling oxygen-containing residual gas from the pressure swing adsorption unit to the cryogenic rectification plant;

(E) cooling high purity argon fluid by indirect heat exchange with oxygen-containing cooling fluid and passing the resulting oxygen-containing cooling fluid into the cryogenic rectification plant; and (F) recovering high purity argon fluid as product high purity argon.

2. The process of claim 1 wherein the residual gas is recycled to the argon column.

3. The process of claim 1 wherein the residual gas is recycled to the lower pressure column.

4. The process of claim 1 wherein the oxygen-containing cooling fluid is feed air.

5. The process of claim 1 wherein the oxygen-containing cooling fluid is oxygen-enriched fluid.

6. The process of claim 1 wherein the pressure swing adsorption unit additionally contains nitrogen selective adsorbent.

7. The process of claim 1 wherein the crude argon fluid is increased in pressure prior to being passed into the pressure swing adsorption unit.

8. The process of claim 1 wherein at least one of product nitrogen and product oxygen is recovered from the cryogenic rectification plant.

9. Apparatus for producing high purity argon comprising:

(A) a cryogenic rectification plant comprising a first column, a second column and an argon column, means for passing feed air into the first column, and means for passing fluid from the lower portion of the first column into the second column;

(B) means for passing fluid from the second column into the argon column;

(C) a pressure swing adsorption unit containing oxygen selective adsorbent and means for passing fluid from the upper portion of the argon column into the pressure swing adsorbent unit;

(D) means for passing fluid from the pressure swing adsorption unit into the cryogenic rectification plant;

(E) a heat exchanger and means for passing oxygen-containing cooling fluid to the heat exchanger and from the heat exchanger into the cryogenic rectification plant; and (F) means for passing high purity argon from the pressure swing adsorption unit to the heat exchanger and means for recovering product high purity argon from the heat exchanger.

10. The apparatus of claim 9 wherein the pressure swing adsorption unit additionally contains nitrogen selective adsorbent.

* * * * *